United States Patent [19]
Schubert

[11] Patent Number: 5,201,805
[45] Date of Patent: Apr. 13, 1993

[54] WEAR REDUCING PISTON FOR COMBUSTION ENGINE

[76] Inventor: Hans Schubert, 925 Alma St., Palo Alto, Calif. 94301

[21] Appl. No.: 864,218

[22] Filed: Apr. 6, 1992

[51] Int. Cl.$^5$ ............................................. F01M 11/02
[52] U.S. Cl. ............................. 123/196 M; 123/193.4; 92/160
[58] Field of Search ........... 123/196 M, 196 R, 193.4; 92/160

[56] References Cited

U.S. PATENT DOCUMENTS

| | | | |
|---|---|---|---|
| 3,563,130 | 2/1971 | Hollingsworth | 92/160 |
| 4,041,924 | 8/1977 | Grosseau | 123/193.4 |
| 4,056,044 | 11/1977 | Kamman | 92/160 |
| 4,058,104 | 11/1977 | Swoager | 92/160 |
| 4,742,803 | 5/1988 | Chiles et al. | 123/196 M |
| 4,936,269 | 6/1990 | Beaty | 123/193.4 |

FOREIGN PATENT DOCUMENTS

| | | | |
|---|---|---|---|
| 187342 | 10/1956 | Austria | 123/196 M |
| 0117842 | 9/1979 | Japan | 123/196 M |
| 0150060 | 9/1983 | Japan | 123/196 M |
| 0204665 | 8/1990 | Japan | 123/193.4 |
| 1560756 | 4/1990 | U.S.S.R. | 123/193.4 |
| 9013763 | 11/1990 | World Int. Prop. O. | 123/193.4 |

*Primary Examiner*—E. Rollins Cross
*Assistant Examiner*—Erick Solis
*Attorney, Agent, or Firm*—Paul F. Schenck

[57] ABSTRACT

The reduction of wear at the cylinder walls of combustion engines is achieved by a new type of piston with special channels and facilities for collecting lubricants and distributing the lubricants during the piston movement and especially during the first cycles onto areas of highest wear of the cylinder wall.

12 Claims, 1 Drawing Sheet

WEAR REDUCING PISTON FOR COMBUSTION ENGINE

BACKGROUND OF THE INVENTION

The wear and tear in internal combustion engines occurs mostly at the top of the cylinder and is attributed to insufficient lubrication between the piston and the cylinder wall. Especially sensitive are the sides where the thrust side of the piston moves upon, adjacent to the plane which is 90 degree off the plane in which the wrist pin of the piston moves. This plane is defined by the movement of the connecting rod. On engines designed up to now, the oil is removed from the cylinder walls, which is really important at the bottom of the cylinder walls. At the top of the cylinder, where no oil is splashed on, lubrication is partial. Especially during the first cycles of an operation lubrication in the upper section of the cylinder does not satisfy the needs.

SHORT DESCRIPTION OF THE INVENTION

The present invention improves the lubrication of the upper cylinder wall, especially in the areas where it is needed, adjacent to the plane defined by the movement of the connecting rod. The present invention helps control the oil at the bottom of the cylinder walls where oil is available in abundance, too. A fine balance of lubricating oil is essential to the life of an engine and good fuel economy. The present invention establishes improved lubrication and fuel economy in a very practical and inexpensive way.

During the operation of the piston inside the cylinder, oil is splashed onto the inside wall of the piston and onto the lower cylinder wall while the piston is off the bottom position. Depending upon the movement of the piston and the acceleration and deceleration of the piston oil splashed onto the inner wall of the piston moves up and down the piston wall. During the second half of the piston movement towards the top position the piston decelerates. The oil due its inertia will flow towards the top of the piston. During the first half of the piston movement towards the bottom position the piston accelerates and the oil clinging to the piston wall is again flowing to the top of the piston. During the first half of the piston movement to the top position and the second half of the piston movement towards the bottom position oil clinging to the piston wall will flow towards the bottom rim of the piston.

The present invention makes use of the oil flowing towards the piston top during certain phases of the piston movement for lubricating the cylinder wall. Openings provided just below the piston rings allow the oil to pass through the piston wall and to be ejected against the cylinder wall.

As indicated above oil is splashed onto the lower cylinder wall. A piston of the present invention includes means to scoop up some of the oil. The collected oil is release during the second half of the piston's upward movement and the first half of the piston's downward movement. Part of the collected oil flows inside the piston on the piston wall towards the piston top, the rest is flowing on the outer surface of the piston and lubricates the cylinder walls directly.

SHORT DESCRIPTION OF THE DRAWINGS

DESCRIPTION OF THE PREFERRED EMBODIMENT

Figure 1A:
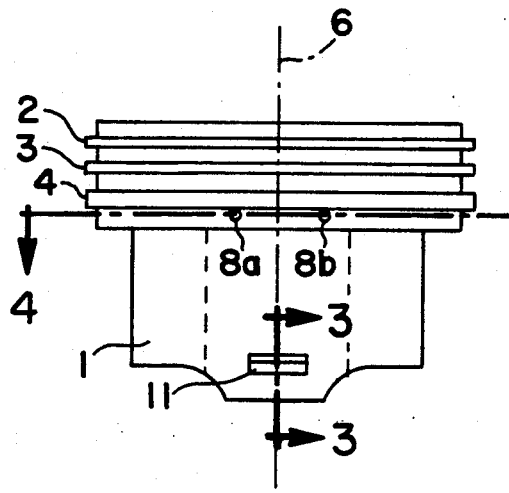
FIGS. 1a and 1b are illustrations of a piston including the features of the present invention
Figure 1B:
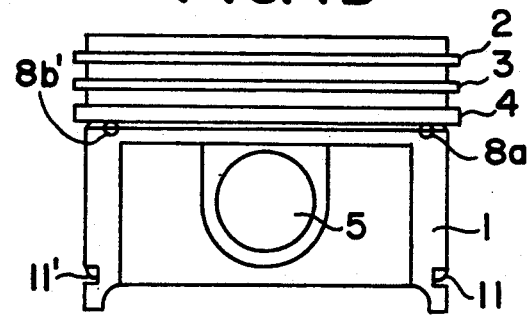

FIG. 1a is a front view illustration of a piston 1 with the additional lubrication means of the present invention. FIG. 1b is a side view illustration of piston 1 of FIGS. 1a. In FIG. 1a and 1b piston 1 has two regular piston rings 2 and 3, and an oil ring 4. Opening 5 is one of the two openings provided for receiving the wrist pin which links piston 1 with the connecting rod (not shown). Center line 6 defines the plane normal to the plane of the wrist pin movement during operation of piston 1 in a cylinder (and normal to the plane of the drawing). Left and right of this so defined plane there are each one openings 8a and 8b (see FIG. 1a). There are another set of two openings on the rear side of piston 1, as indicated by opening 8a' in FIG. 1b. Openings 8a and 8b are passages for lubricants from the inside of piston 1 to the outside of piston 1. During the deceleration phase of the upward movement of piston 1 and during the acceleration phase of the downward movement of piston 1 in the cylinder lubricants are transferred from the inside of piston 1 through openings 8a and 8b, and 8a' and 8b' (see also FIG. 4). The ejected lubricant is distributed over the cylinder wall in the area of highest wear.

In the lower section 12 of piston 1 there is second additional lubrication means 11. As indicated in FIG. 1b, this feature is provided on the frontside and the rearside of piston 1.

Figure 2:
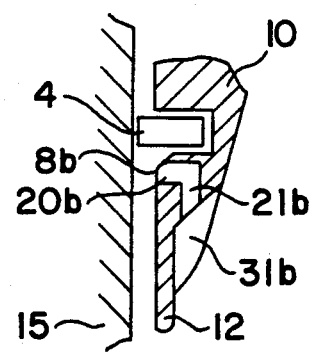
FIG. 2 is a cross-sectional view illustration of the piston of FIG. 1 showing first additional lubrication means.
Figure 5:
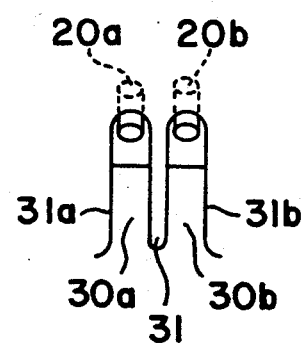
FIG. 5 is an illustration of the open oil channels inside the piston of the present invention.

FIG. 2 is an illustration of a partial cross-sectional view of piston 1 through lubrication opening 8b (vertical cut through the piston wall at the location of opening 8b in FIG. 1A). Piston 1 has a thick walled upper section 10, and a thin walled lower section 12. Upper section 10 includes the recesses for receiving piston rings 2 and 3, and a recess for oil ring 4. Opening 8b is connected via channels 20b and 21b to the interior of piston 1. Openings 8a and 8b are connected via corresponding channels 20a and 20b, and 21a and 21b to the interior of piston 1. To direct the oil into channels 21a through 21b open channels 30a, 30b separated by rip 31 may be provided on the inside of the piston as shown in FIG. 5.

Figure 3:
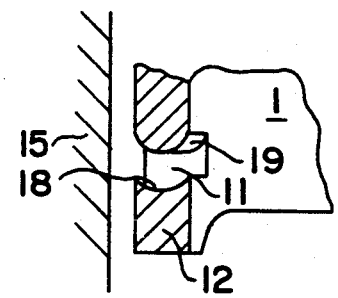
FIG. 3 is an illustration of another cross-sectional view of the piston of FIG. 1 showing second additional lubrication means.

FIG. 3 is a cross-sectional view identified by 3—3 in FIG. 1a. In FIG. 3 lower wall section 12 of piston 1 includes a trough shaped lubricant reservoir 11. Reservoir 11 may be fully recessed in wall 12, as shown in FIG. 2, or it may be protruding into the interior of piston 1. Reservoir 11 is a preferably square opening symmetrical to center axis 6. Bottom 18 of reservoir 11 is concave to store a small amount of lubricant, top 19 of reservoir 11 is convex. Reservoir 11 collects lubricant from interior wall section of piston 1 and from cylinder wall 15 during the acceleration phase of the upward movement of piston 1 and during the deceleration phase of the downward movement of piston 1. During the deceleration phase of the upward movement of piston 1 and during the acceleration phase of the downward movement of piston the lubricant collected in reservoir 11 is ejected from reservoir 11 to cylinder wall 15 and inner wall of piston wall 12. The shape of convex top 19 of reservoir 11 determines how much of the collected lubricant is ejected onto cylinder wall 15. When the engine is not in operation reservoir 11 stores sufficient lubricants for the first cycle of piston 1 after restart.

In FIG. 2 lubricant entering channel sections 21b and 20b will be ejected towards cylinder wall 15, thereby providing extra lubricants in the area of highest wear. In FIGS. 1a and 1b a total of 4 openings 8a and 8b, and 8a' and 8b' provide extra lubricant to cylinder wall 15. As indicated in FIG. 2 opening 8d representing all openings 8 partially extends into the champfer area below oil ring 4.

Figure 4:
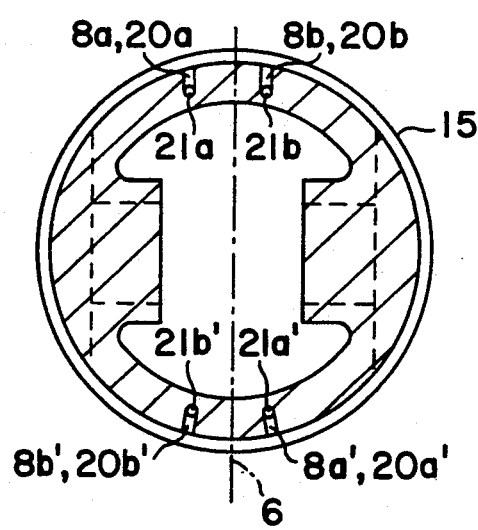
FIG. 4 is a cross-sectional view of the piston of FIGS. 1a and 1b in the plane of the first additional lubrication means illustrating radial and non-radial ejection channels.

FIG. 4 is a cross-sectional view identified by 4—4 in FIG. 1a. In FIG. 4 channels 20a' and 20b', are shown to extent radially from channels 21a' and 21b', respectively, and the ejected lubricant hits the cylinder wall under a right angle. The amount of lubricants so distributed depends on the size of channels 20a' and 20b', and 21a' and 21b'. If a different distribution is intended the number of lubricant passages can be increased. Channels 20a and 20b are show to extend parralel to the plane market by axis 6. This orientation directs the ejected lubricants towards the plane marked by axis 6.

The distribution of the ejected lubricants over cylinder wall 15 depends on the angles between channels 20a and 20b, 20a' and 20b' and the outer piston wall. A channel 20 oriented normal to the outer piston wall will provide lubricant over a narrow area of the opposing cylinder wall 15. A channel 20 oriented under an angle not normal to the outer piston wall will provide about the same amount of lubricants over a wider area of cylinder wall 15. By selecting proper angles for channels 20, an appropriate amount of lubricants can be provided in accordance with the expected wear pattern. FIG. 4 is a cross-sectional view "A—A" of a FIG. 1. This cross-sectional illustration include two ways of arranging oil ejection channels 20. In the lower section channels 20a' and 20b' extend radially from corresponding channels 21a' and 21b'. In the upper half of FIG. 4 channels 20a and 20b are shown to be parallel. Parallel channels have different ejection angles. Openings close to center plane 6 provide a large amount of lubricant to a smaller area of piston wall 15 while openings more distant from plane 6, which are angled relative to the opposing cylinder wall provide the ejected lubricant over a larger area of the opposing cylinder wall. Depending upon lubrication requirements other ejection angles may be selected.

In FIG. 2 the lubrication channels are shown to consist of two sections 20 and 21, straight channels may be used instead, reducing the fluid-dynamic friction at the expense that the lubricant is ejected with a strong upward vector.

Furthermore, it is considered to be within the scope of this invention to have reservoir 11 implemented by attaching a separate piece of suitably formed metal to the inside of piston 1, thereby upgrading an existing piston.

On the inner wall of piston 1 it may be advantageous to provide short rips (dashed line 30) between adjacent openings to channels 21 to guide lubricant into channels 21.

What is claim is:

1. A wear reducing piston for a cylinder of an internal combustion engine having a crankshaft, and a connecting rod, said connecting rod moving during operation in a plane, said piston comprising
   a top, a cylindrical body, an inner open space, a wrist pin for linking said piston to said connecting rod of said engine and an oil ring;
   a plurality of lubrication channels located substantially symmetrical to said plane in said piston wall for guiding lubricants through said body and ejecting lubricants below said oil ring directly against the wall of said cylinder in close vicinity to said plane.

2. A wear reducing piston for a cylinder of an internal combustion engine as claimed in claim 1, further comprising
   a reservoir for lubricants located in the wall of said piston;
   an opening in said piston wall for guiding oil received from said cylinder wall into said reservoir;
   said lubrication channels in said pistion wall guiding lubricants from said reservoir through said body and ejecting lubricants against the wall of said cylinder.

3. A wear reducing piston as claimed in claim 2, wherein said reservoir including a recessed trough in said wall of said piston and open to the inside of said piston.

4. A wear reducing piston as claimed in claim 1, wherein said channels are located symmetrically to the plane of said connecting rod.

5. A wear reducing piston as claimed in claim 2, wherein said channels are located symmetrically to the plane of said connecting rod.

6. A wear reducing piston as claimed in claim 4 wherein said piston includes piston rings and an oil ring, and wherein said channels end on said outer wall of said piston in a plane substantially parallel to said oil ring and in close proximity thereto.

7. A wear reducing piston as claimed in claim 6 wherein said channels penetrate the outer wall of said piston in radial direction.

8. A wear reducing piston as claimed in claim 6 wherein said channels penetrate the outer wall of said piston in a radial upward direction to said outer wall.

9. A wear reducing piston a claimed in claim 5 wherein said channels penetrate said outer wall pair wise under different angles to the circumference of said piston.

10. A wear reducing piston a claimed in claim 5, said piston being linked to a connecting rod, said connecting rod moving during operation in a plane, wherein said channels penetrate said outer wall pair wise under different angles, said penetration being pair wise oriented towards the plane of the movement of said connecting rod.

11. A wear reducing piston for a cylinder of an internal combustion engine as claimed in claim 1, said piston being linked to a connecting rod, said connecting rod moving during operation in a plane, said piston further comprising
    a reservoir for lubricants located substantially symmetrical to said plane at the lower end in the wall of said piston and having an opening to the outer surface of said piston;
    a reservoir having a concave bottom for collecting lubricant and a convex top for guiding collected lubricant towards the outside surface of said piston.

12. A wear reducing piston for a cylinder of an internal combustion engine as claimed in claim 11, wherein said reservoir collects lubricant from the inside of said piston for ejection towards said wall of said cylinder.

* * * * *